(12) United States Patent  (10) Patent No.: US 8,831,016 B2
Wallace et al.  (45) Date of Patent: Sep. 9, 2014

(54) METHODS, SYSTEMS, AND COMPUTER READABLE MEDIA FOR CONFIGURABLE DIAMETER ADDRESS RESOLUTION

(75) Inventors: Donald E. Wallace, Evergreen, CO (US); Mark E. Kanode, Apex, NC (US); Thomas M. McCann, Raleigh, NC (US); Sridhar Karuturi, Raleigh, NC (US); Kedar K. Karmarkar, Pune (IN)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/424,001

(22) Filed: Mar. 19, 2012

(65) Prior Publication Data

US 2012/0236871 A1  Sep. 20, 2012

Related U.S. Application Data

(60) Provisional application No. 61/454,462, filed on Mar. 18, 2011.

(51) Int. Cl.
*H04L 12/56* (2006.01)
*H04L 29/12* (2006.01)

(52) U.S. Cl.
CPC ..................................... *H04L 61/10* (2013.01)
USPC .......................................................... 370/401

(58) Field of Classification Search
None
See application file for complete search history.

(56) References Cited

U.S. PATENT DOCUMENTS

| 4,310,727 | A | 1/1982 | Lawser |
| 4,754,479 | A | 6/1988 | Bicknell et al. |
| 5,089,954 | A | 2/1992 | Rago |
| 5,237,604 | A | 8/1993 | Ryan |
| 5,247,571 | A | 9/1993 | Kay et al. |
| 5,251,248 | A | 10/1993 | Tokunaga et al. |
| 5,400,390 | A | 3/1995 | Salin |
| 5,422,941 | A | 6/1995 | Hasenauer et al. |
| 5,423,068 | A | 6/1995 | Hecker |
| 5,430,719 | A | 7/1995 | Weisser, Jr. |
| 5,442,683 | A | 8/1995 | Hoogeveen |
| 5,455,855 | A | 10/1995 | Hokari |

(Continued)

FOREIGN PATENT DOCUMENTS

CN  1968267 A  5/2007
CN  200680051295  3/2013

(Continued)

OTHER PUBLICATIONS

Notification of Transmittal of the International Search Report and the Written Opinion of the International Searching Authority, or the Declaration for International Application No. PCT/US2012/029673 (Oct. 31, 2012).

(Continued)

*Primary Examiner* — Rhonda Murphy
(74) *Attorney, Agent, or Firm* — Jenkins, Wilson, Taylor & Hunt, P.A.

(57) ABSTRACT

Methods, systems, and computer readable media for configurable Diameter address resolution are disclosed. One method includes, at a Diameter signaling router (DSR), sending Diameter signaling messages to and receiving Diameter signaling messages from Diameter signaling entities in a network. The method further includes providing for configuration of a plurality of routing entity identities and an order for preferentially using the routing entity identities in performing Diameter address resolution. The method further includes routing Diameter signaling messages using Diameter address information determined in the Diameter routing address resolution.

19 Claims, 7 Drawing Sheets

(56) References Cited

U.S. PATENT DOCUMENTS

| | | |
|---|---|---|
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichanni et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 7,010,002 B2 | 3/2006 | Chow et al. |
| 7,027,433 B2 | 4/2006 | Touhino et al. |
| 7,027,582 B2 | 4/2006 | Khello et al. |
| 7,039,037 B2 | 5/2006 | Wang et al. |
| 7,054,652 B2 | 5/2006 | Luis |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,170,982 B2 | 1/2007 | Li et al. |
| 7,221,952 B2 | 5/2007 | Cho et al. |
| 7,286,839 B2 | 10/2007 | McCann et al. |
| 7,366,530 B2 | 4/2008 | McCann et al. |
| 7,397,773 B2 | 7/2008 | Qu et al. |
| 7,551,608 B1 | 6/2009 | Roy |
| 7,660,287 B2 | 2/2010 | Axelsson et al. |
| 7,715,367 B2 | 5/2010 | Nishida et al. |
| 7,751,386 B2 | 7/2010 | Kobayashi et al. |
| 7,756,518 B2 | 7/2010 | Xu et al. |
| 7,787,445 B2 | 8/2010 | Marsico |
| 7,889,716 B2 | 2/2011 | Tejani et al. |
| 7,996,541 B2 | 8/2011 | Marathe et al. |
| 8,254,551 B2 | 8/2012 | Heinze et al. |
| 8,452,325 B2 | 5/2013 | McCann |
| 2001/0030957 A1 | 10/2001 | McCann et al. |
| 2001/0040957 A1 | 11/2001 | McCann et al. |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2003/0007482 A1 | 1/2003 | Khello et al. |
| 2003/0013464 A1 | 1/2003 | Jean Henry-Labordere |
| 2003/0026289 A1 | 2/2003 | Mukherjee et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0128693 A1 | 7/2003 | Segal |
| 2003/0181206 A1 | 9/2003 | Zhou et al. |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0053604 A1 | 3/2004 | Ratilainen et al. |
| 2004/0053610 A1 | 3/2004 | Kim |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0141488 A1 | 7/2004 | Kim et al. |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0243596 A1 | 12/2004 | Lillqvist et al. |
| 2004/0246965 A1 | 12/2004 | Westman et al. |
| 2005/0143075 A1 | 6/2005 | Halsell |
| 2005/0182781 A1 | 8/2005 | Bouvet |
| 2005/0286531 A1 | 12/2005 | Tuohino et al. |
| 2006/0002308 A1 | 1/2006 | Na et al. |
| 2006/0002400 A1 | 1/2006 | Kenyon et al. |
| 2006/0034256 A1 | 2/2006 | Addagatla et al. |
| 2006/0067338 A1 | 3/2006 | Hua et al. |
| 2006/0098621 A1 | 5/2006 | Plata et al. |
| 2006/0136557 A1 | 6/2006 | Schaedler et al. |
| 2006/0165068 A1 | 7/2006 | Dalton et al. |
| 2006/0293021 A1 | 12/2006 | Zhou |
| 2007/0019625 A1 | 1/2007 | Ramachandran et al. |
| 2007/0061397 A1 | 3/2007 | Gregorat et al. |
| 2007/0115934 A1 | 5/2007 | Dauster et al. |
| 2007/0116250 A1 | 5/2007 | Stafford |
| 2007/0121879 A1 | 5/2007 | McGary et al. |
| 2008/0037759 A1 | 2/2008 | Chin et al. |
| 2008/0051036 A1 | 2/2008 | Vaswani et al. |
| 2008/0109532 A1 | 5/2008 | Denoual et al. |
| 2008/0112399 A1 | 5/2008 | Cohen et al. |
| 2008/0130856 A1 | 6/2008 | Ku et al. |
| 2008/0137832 A1 | 6/2008 | Heinze et al. |
| 2008/0171544 A1 | 7/2008 | Li et al. |
| 2008/0247526 A1 | 10/2008 | Qiu et al. |
| 2008/0281975 A1 | 11/2008 | Qiu et al. |
| 2008/0311917 A1 | 12/2008 | Marathe et al. |
| 2009/0103707 A1 | 4/2009 | McGary et al. |
| 2009/0193498 A1* | 7/2009 | Agarwal et al. .................. 726/1 |

(56) References Cited

U.S. PATENT DOCUMENTS

| | | | |
|---|---|---|---|
| 2010/0284336 A1 | 11/2010 | Rui et al. | |
| 2010/0285800 A1 | 11/2010 | McCann | |
| 2012/0302229 A1* | 11/2012 | Ronneke | 455/422.1 |
| 2012/0311102 A1* | 12/2012 | Stenfelt | 709/219 |

FOREIGN PATENT DOCUMENTS

| | | |
|---|---|---|
| EP | 0 512 962 A2 | 11/1992 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 958 399 B1 | 2/2012 |
| KR | 2003-0040291 A1 | 5/2003 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 03/005664 A2 | 1/2003 |
| WO | WO 2004/006534 A1 | 1/2004 |
| WO | WO 2004/008786 A1 | 1/2004 |
| WO | WO 2004/075507 A2 | 9/2004 |
| WO | WO 2006/072473 A1 | 7/2005 |
| WO | WO 2007/045991 A1 | 4/2007 |
| WO | WO 2007/064943 A2 | 6/2007 |
| WO | WO 2008/011101 A2 | 1/2008 |
| WO | Wo 2008/073226 | 6/2008 |
| WO | WO 2008/157213 A2 | 12/2008 |

OTHER PUBLICATIONS

Notice of Granting Patent Right for Invention for Chinese Patent Application No. 200680051295.9 (Nov. 6, 2012).
Decision of Rejection for Chinese Patent Application No. 200780034804.1 (Aug. 31, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"3rd Generation Partnership Project; Technical Specification Group Core Network and Terminals; IP multimedia call control protocol based on Session Initiation Protocol (SIP)and Session Description Protocol (SDP); Stage 3 (Release 11)," 3GPP TS 24.229, V11.3.0, pp. 1-728 (Mar. 2012).
"3rd Generation Partnership Project; Technical Specification Group Core Network and Terminals; Sh Interface based on the Diameter protocol; Protocol details (Release 11)," 3GPP TS 29.329, V11.1.0, pp. 1-22 (Dec. 2011).
"3rd Generation Partnership Project; Technical Specification Group Core Network and Terminals; IP Multimedia (IM) Subsystem Sh interface; Signalling flows and message contents (Release 11)," 3GPP TS 29.328, V11.2.0, pp. 1-53 (Dec. 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11)," 3GPP T.3. 29.272, V11.1.0 pp. 1-98 (Dec. 2011).
"3rd Generation Partnership Project; Technical Specification Group Core Network and Terminals; Cx and Dx interfaces based on the Diameter protocol; Protocol details (Release 11)," 3GPP TS 29.229, V11.2.0, pp. 1-37 (Dec. 2011).
"3rd Generation Partnership Project; Technical Specification Group Core Network and Terminals; IP Multimedia (IM) Subsystem Cx and Dx interfaces; Signalling flows and message contents (Release 11)," 3GPP TS 29.228, V11.2.0, pp. 1-71 (Dec. 2011).
"3rd Generation Partnership Project; Technical Specification Group Core Network and Terminals; Policy and Charging Control over Rx reference point (Release 11)," 3GPP TS 29.214, V11.3.0, pp. 1-51 (Dec. 2011).

"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
"3rd Generation Partnership Project; Technical Specification Group Core Network and Terminals; Mobile Application Part (MAP) specification (Release 11)," 3GPP TS 29.002, V11.1.0, pp. 1-954 (Dec. 2011).
"3rd Generation Partnership Project; Technical Specification Group Core Network and Terminals; Organization of subscriber data (Release 11)," 3GPP TS 23.008, V11.2.0, pp. 1-105 (Dec. 2011).
"3rd Generation Partnership Project; Technical Specification Group Core Network and Terminals; Numbering, addressing and identification (Release 11)," 3GPP TS 23.003, V11.0.0, pp. 1-81 (Dec. 2011).
"3rd Generation Partnership Project; Technical Specification Group Services and System Aspects; Network architecture (Release 11)," 3GPP TS 23.002, V11.1.0, pp. 1-96 (Dec. 2011).
"3rd Generation Partnership Project; Technical Specification Group Services and System Aspects; Telecommunication management; Charging management; Charging Data Record (CDR) transfer (Release 10)," 3GPP TS 32.295, V10.0.0, pp.1-32 (Mar. 2011).
"3rd Generation Partnership Project; Technical Specification Group Core Network and Terminals; Generic Authentication Architecture (GAA); Zh and Zn Interfaces based on the Diameter protocol; Stage 3 (Release 10)," 3GPP TS 29.109., V10.0.0, pp. 1-67 (Mar. 2011).
"The international public telecommunication numbering plan," ITU-T, E.164, pp. 1-32 (Nov. 2010).
"The international identification plan for public networks and subscriptions," ITU-T, E.212, pp. 1-28 (May 2008).
"3rd Generation Partnership Project; Technical Specification Group Core Network and Terminals; Charging rule provisioning over Gx interface (Release 6)," 3GPP TS 29.210, V6.7.0, pp.1-21 (Dec. 2006).
"3rd Generation Partnership Project; Technical Specification Group Service and System Aspects; Telecommunication management; Charging management; Charging data description for the IP Multimedia Subsystem (IMS) (Release 5)," 3GPP TS 32.225, V5.11.0, pp. 1-63 (Mar. 2006).
Aboba et al., "The Network Access Identifier," RFC 4282, pp. 1-17 (Dec. 2005).
Hakala et al., "Diameter Credit-Control Application," RFC 4006, pp. 1-115 (Aug. 2005).
Calhoun et al., "Diameter Network Access Server Application," RFC 4005, pp. 1-86 (Aug. 2005).
Schulzrinne, "The tel URI for Telephone Numbers," RFC 3966, pp. 1-18 (Dec. 2004).
Rosenberg et al., "SIP: Session Initiation Protocol," RFC 3261, pp. 1-270 (Jun. 2002).
Berners-Lee et al., "Uniform Resource Identifiers (URI): Generic Syntax," RFC 2396, pp. 1-41 (Aug. 1998).
Non-Final Official Action for U.S. Appl. No. 12/777,853 (Aug. 29, 2012).
Notice of Loss of Rights Pursuant to Rule 112(1) EPC for European Patent Application No. 07867566.7 (Jul. 31, 2012).
First Official Action for Chinese Patent Application No. 200880103119.4 (Jul. 4, 2012).
Notice of Allowance and Fee(s) Due for U.S. Appl. No. 11/635,406 (Apr. 20, 2012).
Third Office Action for Chinese Patent Application No. 200680051295.9 (Mar. 20, 2012).
Advisory Action for U.S. Appl. No. 11/635,406 (Mar. 14, 2012).
Interview Summary for U.S. Appl. No. 11/635,406 (Mar. 7, 2012).
Second Office Action for Chinese Patent Application No. 200780034804.1 (Feb. 21, 2012).
Decision to Grant a European Patent Pursuant to Article 97(1) EPC for European Patent Application No. 06844747.3 (Jan. 19, 2012).
Final Official Action for U.S. Appl. No. 11/635,406 (Nov. 30, 2011).
Second Office Action for Chinese Patent Application No. 200680051295.9 (Oct. 9, 2011).
Notice of Panel Decision from Pre-Appeal Brief Review for U.S. Appl. No. 11/635,406 (Oct. 3, 2011).
Communication under Rule 71(3) EPC for European Application No. 06 844 747.3 (Jul. 19, 2011).

(56) References Cited

OTHER PUBLICATIONS

First Office Action for Chinese Patent Application No. 200780034804.1 (May 19, 2011).
Final Official Action for U.S. Appl. No. 11/635,406 (Apr. 5, 2011).
Notice of Allowance and Fee(s) Due for U.S. Appl. No. 11/888,907 (Apr. 1, 2011).
"Ericsson Unified Number Portability," (Downloaded from the Internet on Jan. 24, 2011).
Chinese Official Action for Chinese Patent Application No. 200680051295.9 (Dec. 24, 2010).
Notification of Transmittal of the International Search Report and the Written Opinion of the International Searching Authority, or the Declaration for International Application No. PCT/US2010/034372 (Nov. 30, 2010).
Notice of Allowance and Fee(s) Due for U.S. Appl. No. 11/291,502 (Oct. 5, 2010).
Official Action for U.S. Appl. No. 11/888,907 (Sep. 16, 2010).
Communication pursuant to Article 94(3) EPC for European application No. 07810606.9 (Aug. 26, 2010).
Official Action for U.S. Appl. No. 11/635,406 (Aug. 26, 2010).
Tsou et al., "Realm-Based Redirection in Diameter," draft-ietf-dime-realm-based-redirect-03, RFC 3588, pp. 1-6 (Jul. 12, 2010).
Communication Pursuant to Article 94(3) EPC for European Application No. 06844747.3 (May 11, 2010).
Notice of Allowance and Fee(s) Due for U.S. Appl. No. 11/879,737 (Apr. 22, 2010).
Communication pursuant to Article 94(3) EPC for European application No. 07810606.9 (Feb. 12, 2010).
Final Official Action for U.S. Appl. No. 11/291,502 (Feb. 4, 2010).
Korhonen et al., "Clarifications on the Routing of Diameter Requests Based on the Username and the Realm," RFC 5729, pp. 1-9 (Dec. 2009).
Supplementary European Search Report for European application No. 07810606.9 (Nov. 23, 2009).
Non-Final Official Action for U.S. Appl. No. 11/879,737 (Sep. 30, 2009).
Communication of European publication number and information on the application of Article 67(3) EPC for European application No. 07867566.7 (Aug. 12, 2009).
Communication pursuant to Article 94(3) EPC for European Application No. 06844747.3 (Jul. 28, 2009).
Notification Concerning Transmittal of International Preliminary Report on Patentability for International Application No. PCT/US2007/024418 (Jun. 18, 2009).
Final Official Action for U.S. Appl. No. 11/879,737 (Jun. 9, 2009).
Official Action for U.S. Appl. No. 11/291,502 (May 13, 2009).
Supplementary European Search Report for European Application No. 06844747.3 (Apr. 24, 2009).
Communication of European publication number and information on the application of Article 67(3) EPC for European Application No. 07810606.9 (Mar. 18, 2009).
Notification of Transmittal of the International Search Report and the Written Opinion of the International Searching Authority, or the Declaration for International Application No. PCT/US2008/066675 (Dec. 9, 2008).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US07/16370 (Sep. 15, 2008).
Official Action for U.S. Appl. No. 11/879,737 (Sep. 15, 2008).
Notification of Transmittal of the International Search Report and the Written Opinion of the International Searching Authority, or the Declaration for International Application No. PCT/US2006/046108 (Sep. 9, 2008).
Communication of European publication number and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/24418 (May 1, 2008).
"3rd Generation Partnership Project; Technical Specification Group Services and System Aspects; Policy and charging control architecture (Release 8)," 3GPP TS 23.203, V8.1.1, pp. 1-87 (Mar. 2008).
"IP Multimedia Subsystem," printout from wikipedia.org, Wikimedia Foundation, Inc. (May 29, 2007).
"HP OpenCall Home Subscriber Server Software—Data Sheet", 4AA0-3360ENW Rev. 2, Hewlett-Packard Development Company, L.P. (Jul. 2006).
Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).
Schwarz, "ENUM Trial to Link Phone, Internet Addresses," (Mar. 22, 2005).
Peterson, "Telephone Number Mapping (ENUM) Service Registration for Presence Services," Network Working Group, RFC 3953 (Jan. 2005).
Jones, "The Definitive Guide to Scaling Out SQL Server," http://www.snip.gob.ni/Xdc/SQL/DGSOSSFinal.pdf (Retrieved on Aug. 16, 2010) (2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Peterson et al., "Using E.164 Numbers With the Session Initiation Protocol (SIP)," Network Working Group, RFC 3824, pp. 1-14 (Jun. 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16. No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Cisco, "Quality of Service Networks," Internetworking Technologies Handbook, Chapter 49, pp. 49-1-49-32 (Sep. 11, 2003).
Calhoun et al., "Diameter Base Protocol," RFC 3588, pp. 1-90 (Sep. 2003).
Moodie, "Agilent acceSS7: White Paper," Agilent Technologies, pp. 1-14 (Apr. 1, 2003).
Foster et al., "Number Portability in the Global Switched Telephone Network (GSTN): An Overview," Network Working Group, RFC 3482 (Feb. 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Global Implementation of ENUM: A Tutorial Paper," International Telecommunication Union, Telecommunication Standardization Union, Study Group 2, (Feb. 8, 2002).

(56) References Cited

OTHER PUBLICATIONS

"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
"Topsail Beach-SS7 Over IP-" Cisco Systems, Inc., pp. 1-16 (Copyright 1999).
Etsi, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
Etsi, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze." Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network Interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Neustar, "ENUM: Driving Convergence in the Internet Age," pp. 1-5 (Publication Date Unknown).
Second Office Action for Chinese Application No. 200880103119.4 (Mar. 19, 2013).
Notice of Allowance and Fee(s) Due for U.S. Appl. No. 12/777,853 (Feb. 7, 2013).
First Examination Report for Indian Application No. 3231/CHENP/2008 (Jan. 2, 2013).
Third Office Action for Chinese Application No. 200880103119.4 (Aug. 19, 2013).
Communication under Rule 71(3) EPC for European Application No. 07 810 606.9 (Mar. 4, 2014).
First Examination Report for Indian Application No. 663/CHEN/2009 (Feb. 6, 2014).
Communication of European publication number and information on the application of Aticle 67(3) EPC for Euopean Application No. 12760372.8 (Jan. 7, 2014).
Final Office Action for Chinese Application No. 200880103119.4 (Dec. 4, 2013).
Extended European Search Report for European Application No. 08770806.1 (Dec. 2, 2013).
Second Office Action for Indian Application No. 3231/CHENP/2008 (Aug. 8, 2013).
"3rd Generation Partnership Project; Technical Specification Group Services and System Aspects; IP Multimedia Subsystem (IMS); Stage 2 (Release 8)," 36PP TS 23.228, V8.1.0 (Jun. 2007).

\* cited by examiner

METHODS, SYSTEMS, AND COMPUTER READABLE MEDIA FOR CONFIGURABLE DIAMETER ADDRESS RESOLUTION

PRIORITY CLAIM

This application claims the benefit of U.S. Provisional Patent Application Ser. No. 61/454,462, filed Mar. 18, 2011; the disclosure of which is incorporated herein by reference in its entirety.

TECHNICAL FIELD

The subject matter described herein relates to routing Diameter messages. More particularly, the subject matter described herein relates to methods, systems, and computer readable media for configurable Diameter address resolution.

BACKGROUND

In Diameter networks, it may be desirable to for network operators to direct Diameter signaling messages for specific subscribers or subscriber groups to nodes assigned to the subscribers or subscriber groups. For example, a network operator may have more than one home subscriber server (HSS), policy and charging rules function (PCRF), or online charging system (OCS). The network operator may desire to define end to end routing from one or more mobility management entities (MMEs), serving GPRS support nodes (SG-SNs), or other nodes to the HSSs, PCRFs, or OCSs, such that messages pertaining to specific subscribers or subscriber groups are directed to specific nodes. Conventional Diameter routing that requires the message originator to specify the final destination host or realm for a message may not be scalable. In addition, different Diameter signaling messages may include different parameters that identify subscribers or subscriber devices and that are located in different attribute value pairs of the Diameter signaling messages. It may be desirable to use some of these parameters for routing or routing address resolution. Accordingly, there exists a need for configurable Diameter address resolution.

SUMMARY

Methods, systems, and computer readable media for configurable Diameter address resolution are disclosed. One method includes, at a Diameter signaling router (DSR), sending Diameter signaling messages to and receiving Diameter signaling messages from Diameter signaling entities in a network. The method further includes providing for configuration of a plurality of routing entity identities and an order for preferentially using the routing entity identities in Diameter address resolution. The method further includes routing Diameter signaling messages using Diameter address information determined in the Diameter routing address resolution.

As used herein, the term "routing entity identity" refers to an identifier in a Diameter signaling message that identifies a subscriber, a subscriber device, or other entity that can be resolved into Diameter address information, such as a destination host, a destination realm, or both.

The subject matter described herein may be implemented using non-transitory computer readable medium having stored thereon executable instructions that when executed by the processor of a computer control the computer to perform steps. In one implementation, the subject matter described herein may be implemented in software embodied in a computer readable medium and executable by a processor. Exemplary computer readable media suitable use with the subject matter described herein include disk memory devices, chip memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanied drawing of which.

DETAILED DESCRIPTION

Figure 1:
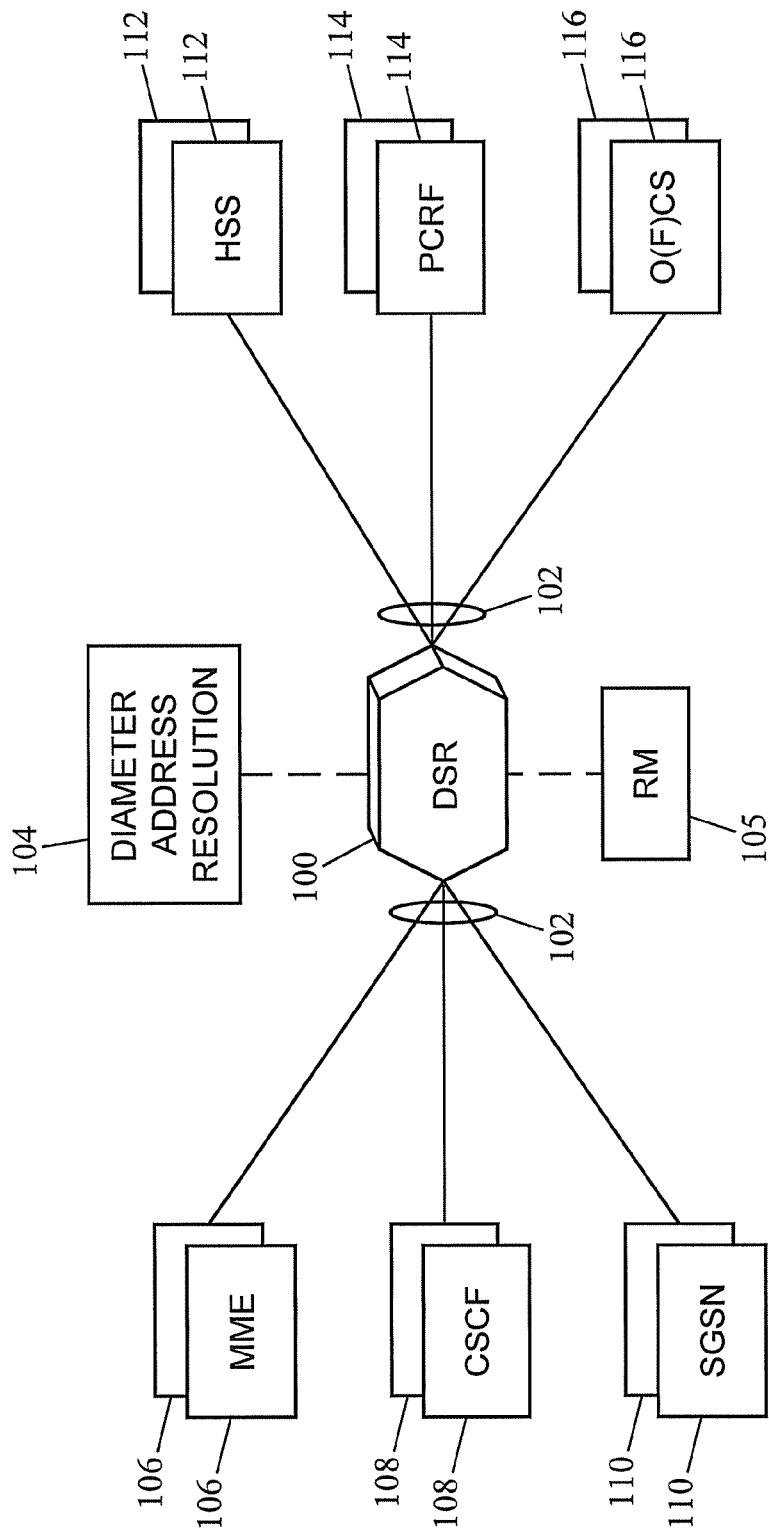
FIG. 1 is a network diagram illustrating a DSR capable of performing Diameter address resolution according to an embodiment of the subject matter described herein.

The subject matter described herein includes methods, systems, and computer readable media for configurable Diameter address resolution. In one exemplary implementation, Diameter address resolution may be provisioned on a DSR. FIG. 1 is a network diagram illustrating a Diameter signaling router with Diameter address resolution according to an embodiment of the subject matter described herein. Referring to FIG. 1, DSR 100 includes network interfaces 102 for sending Diameter messages to and receiving Diameter messages from various network nodes, a Diameter address resolution module 104 for resolving Diameter addresses based on parameters in the messages, and a routing module (RM) 105.

According to an aspect of the subject matter described herein, Diameter address resolution module 104 may provide for configuration of routing entity identities used to search received Diameter signaling messages and, if located, to be used in Diameter address resolution. For example, Diameter address resolution module 104 may include a configuration interface accessible via a terminal local to DSR 100 and/or over a network that allows a user, such as a manufacturer or network operator, to populate data structures with routing entity identifiers, message command codes, preferences among routing entity identity identifiers, attribute value pairs to search for the routing entity identifiers, routing exception rules, and other parameters associated with Diameter address resolution. Exemplary data structures that may be populated by the user will be described in detail below.

In the network illustrated in FIG. 1, DSR 100 is connected to one or more MME nodes 106, one or more call session control function (CSCF) nodes 108, one or more SGSNs 110, one or more HSSs 112 one or more PCRF nodes 114, and one or more online or offline charging system (OCS or OFCS) nodes 116. In order for the network operator to be able to flexibly provision subscriber records among such nodes, configurable address resolution may be required. In one implementation, Diameter address resolution module 104 provides for configuration of a preferred hierarchy of address resolution rules to be applied to received Diameter signaling messages. For example, Diameter user identities, such as international mobile station identifiers (IMSIs), mobile subscriber ISDN numbers (MSISDNs), and IP multimedia public identities (IMPUs), can be assigned a preference order such that a received message is searched to determine when a preferred user identify is present. If that identity is present, Diameter address resolution module 104 may use that identity in an address resolution lookup. If that identity is not present, Diameter address resolution module 104 may use a next most preferred identity to perform the address resolution lookup. In one exemplary implementation, Diameter address resolution may be Diameter-application-independent to support user identity routing of Diameter application messages to any Diameter node via network operator configuration. For example, a Diameter signaling message having a particular user identity may be routed to a Diameter node provisioned for that user identity, independently of Diameter application identifying information in the message.

Figure 2:
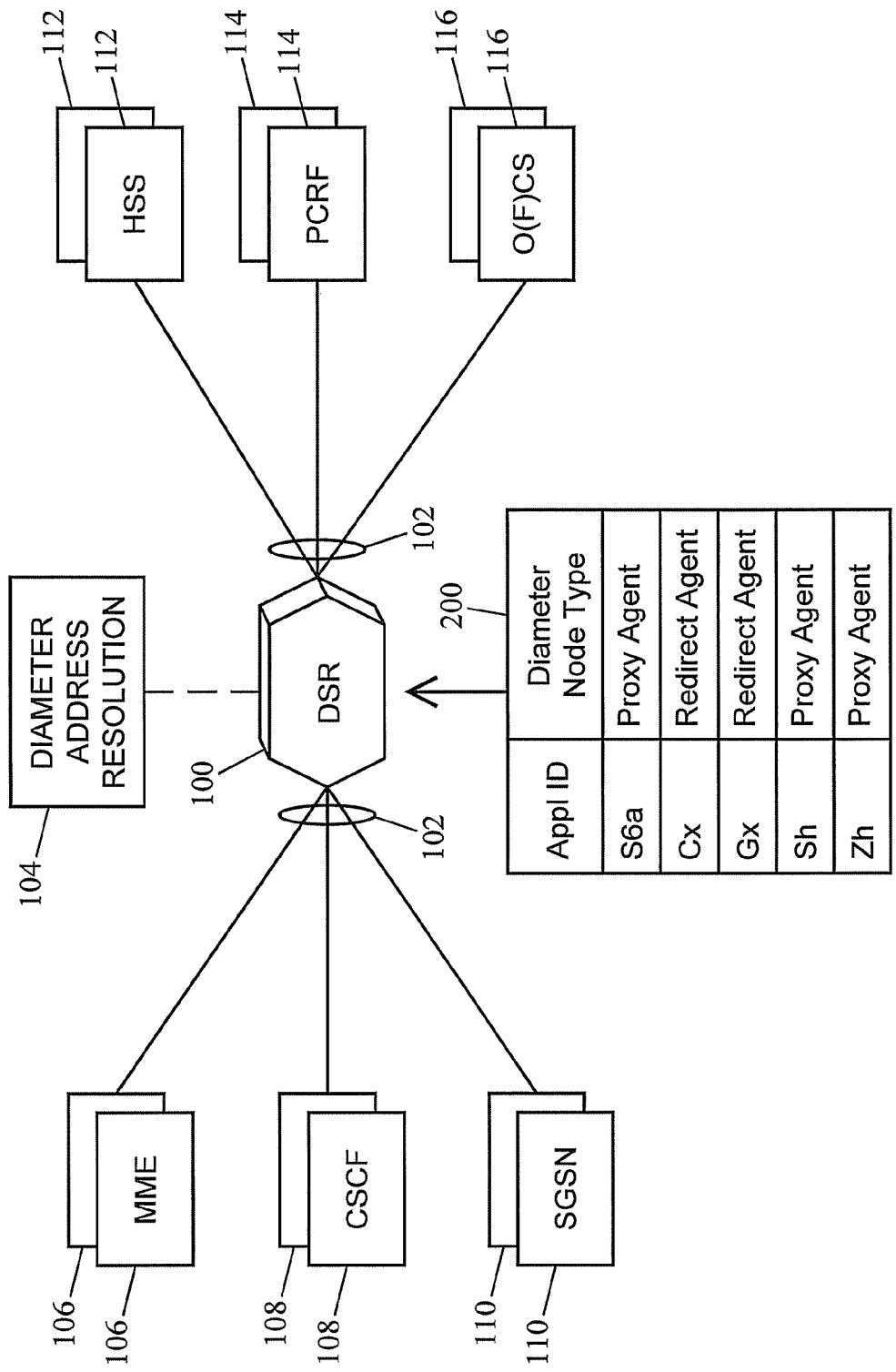
FIG. 2 is a network diagram illustrating a DSR that simultaneously appears as different Diameter node types according to an embodiment of the subject matter described herein.

A DSR that supports Diameter address resolution may simultaneously support the roles of a Diameter proxy agent and a Diameter redirect agent on the same DSR. FIG. 2 illustrates this capability. In FIG. 2, DSR 100 simultaneously supports Diameter proxy and redirect agent roles, depending on the application ID or interface. For example, for the S6a interface, DSR 100 functions as a Diameter proxy agent. The S6a interface is the interface between the MME and the HSS. Accordingly, for Diameter signaling messages between MME 106 and HSS 112, DSR 100 may function as a proxy agent. Similarly, on the Cx interface, DSR 100 may function as a redirect agent. The Cx interface is the interface between the CSCF and the HSS. Accordingly, for messages between CSCF 108 and HSS 112, DSR 100 may function as a redirect agent. The remaining interfaces are specified in table 200 that may be implemented DSR 100.

Diameter address resolution that may be implemented by DSR 100 preferably resolves message parameters into a destination address. The network operator may be able to configure at least one of the following parameters for each destination address:
  Destination Address Name
  For Proxy Agent Addressing:
    Realm
    Host (fully qualified domain name (FQDN)
  For redirected addressing:
    Diameter URI
    Note: Redirect agents respond with a Diameter URI containing the destination address's FQDN and other optional parameters.
  Allow subsequent address resolutions:
    Subsequent address resolutions, i.e., multiple address resolutions for the same Diameter signaling message by different DSRs, may be permitted or not, depending on the preference of the network operator. For example, it may be desirable to allow subsequent address resolutions if an address resolution hierarchy is being implemented. However, if each DSR is configured with at least some overlapping address resolution database entries, steps may be taken to prevent multiple invocations of the same Diameter address resolution for the same message. Exemplary steps will be described in detail below.

Address resolution may be based on the following message content:
  Application ID
  Command code
  User identity DSR 100 may obtain various different types of user identities for address resolution from different types of nodes. The following types of user identities may be obtained from the corresponding nodes:
  Subscriber data concerning a specific MS from the HSS by use of each of the following references: IMSI, MSISDN
  Subscriber IP multimedia service data containing a specific IMS subscription from the HSS: private user identity, public user identity
  PSI IP multimedia service data from the HSS: public service identity
  Subscriber data concerning a specific MS from the VLRs: IMSI, P-TMSI
  Subscriber data concerning a specific a MS from the SGSN: IMSI, P-TMSI, IMEI
  Subscriber data concerning a specific MS from the GGSN: IMSI, IMEI
  Subscriber data concerning a specific MS from the MME: IMSI. 3GPP TS 23.008 defines different types of identities that can be associated with a user or subscriber. Different types of identities may be used in different domains. Circuit switched and packet switched domain user identities that may be used include:
  IMSI, as defined 3GGP TS 23.003. The IMSI is permanent subscriber data. The IMSI may be stored in the HLR, HSS, VLR, SGSN, S4-SGSN, GGSN, MME, S-GW, P-GW, and SMLC.
  MSISDN. The MSISDN is permanent subscriber data that is stored in the HLR, VLR, and GN/GP-SGSN.

Other types of user identities may be used by DSR 100 in performing Diameter address resolution are IP multimedia domain user identities as specified in 3GPP TS 23.008 Section 3. Examples of IMS user identities are as follows:
  Private User Identity
    Applicable to IMS subscribers only
    As defined in 3GPP TS 23.002, takes the form of a network access identifier (NAI), in the form "username@realm", as defined in RFC 4282
    Note: As defined in 3GPP TS 23.008 section 3.1, a private user identity either can be an IMPI (IP multimedia private identity), if the authentication data comes from the IM domain or it can be derived from the IMSI if the authentication data comes from the CS/PS domain
    Permanent subscriber data stored in the HSS and in the S-CSCF
  Public User Identity
    An IMS subscriber can have one or several instances of public user identity or wildcarded public user identity
    As defined in 3GPP TS 23.002, takes the form of a SIP or TEL URI
    Permanent subscriber data stored in HSS, S-CSCF and BSF
    Assumption: This always refers to the IMPU (IP multimedia public identity)

Private Service Identity
  Applicable to a PSI user
  Similar to a private user identity in the form of NAI
  Permanent data stored in the HSS and in the S-CSCF
Public Service Identity (PSI)
  Identifies a service, or a specific resource created for a service on an application service
  May match either to a distinct PSI or a wildcarded PSI that is stored in the HSS
  As defined in 3GPP TS 23.002, takes the form of a SIP or TEL URI
  Permanent data stored in HSS or S-CSCF Table 1 shown below illustrates an example of user identities that may be used by DSR 100 in performing Diameter address resolution.

routing entity identity preference list may include multiple identities ordered according to a network operator's preference for each application ID, command code ordered pair. The routing entity identity preference list may define routing entity identities that can be used for address resolution and the order in which address resolution should look for the user identities in a message. For example, for the Cx interface in Table 1, the routing entity identity preference list for the ordered pair (Cx interface (16777216), *) may be:

1. IMPU—look for an IMPU first; and
2. IMSI—if a valid IMPU is not found, then look for an IMSI Each type of routing entity identity may be carried in a finite set of message attribute value pairs (AVPs). In the 3GPP

TABLE 1

Diameter Message Parameters that are Candidates for Address Resolution

| Interface (Application ID) | 3GPP Spec | Command Code | Routing Entity Identities Supported | AVP (Spec) | Dest Node Type |
|---|---|---|---|---|---|
| Cx (16777216) | 29.228 | LIR (Location-Information) | IMPU (M) | Public-Identity | HSS |
|  | 29.229 | MAR (Multimedia-Information) | IMPU (M), IMSI (M) | Public-Identity, User-Name |  |
|  |  | SAR (Server-Assignment) | IMPU (C), IMSI (C) | Public-Identity*,User-Name |  |
|  |  | UAR (User-Authorization) | IMPU (M), IMSI (M) | Public-Identity, User-Name |  |
| S6a/S6d (16777251) | 29.272 | AIR (Authentication-Info) | IMSI (M) | User-Name | HSS |
|  |  | PUR (Purge) | IMSI (M) | User-Name |  |
|  |  | ULR (Update Location) | IMSI (M) | User-Name |  |
| Sh (16777217) | 29.328 | PUR (Profile-Update) | IMPU (C), MSISDN (C) | User-Identity (Grouped) | HSS |
|  | 29.329 | SNR (Subscribe-Notifications) | IMPU (C), MSISDN (C) | User-Identity (Grouped) |  |
|  |  | UDR (User-Data) | IMPU (C), MSISDN (C) | User-Identity (Grouped) |  |
| Zh (16777221) | 29.109 | MAR (Multimedia-Information) | IMPU (O), IMPI (O) | Public-Identity, User-Name | HSS |
| Gx (16777224) | 29.210 | CCR (Credit-Control) | MSISDN (O), IMSI (O), IMPU (O) | Subscription-Id* (Grouped) | PCRF |
| Gx (16777238) | 29.212 |  | IPv4 Address (O) | Framed-IP-Address |  |
|  |  |  | IPv6 Prefix Address (O) | Framed-IPv6-Prefix |  |
| Gx over Gy (16777225) | 29.210 | CCR (Credit-Control) | Same as Gx | Same as Gx | PCRF |
| Rx (16777236) | 29.214 | AAR (Authorize-Authenticate) STR (Session-Termination)?? | Same as Gx | Same as Gx | PCRF |
| Ro**** (4**) | 32.225 32.299 | CCR (Credit-Control) | Same as Gx | Same as Gx | OCS |
| Ga/Gz (3***) | 32.295 | ACR (Accounting) | IMSI (O) | User-Name | OFCS |
| Rf (3***) | 32.225 32.299 | ACR (Accounting) | IMSI (O) MSISDN (O), IMSI (O), IMPU (O) | User-Name Service-Information* (Grouped) | OFCS |

In Table 1, the following legend applies:
*Multiple Instances are possible
**Diameter Credit Control Application (DCCA) defined in RFC 4006
***Diameter Base Accounting Application defined in RFC 3588
****Gy functionality included in Ro
(M) Mandatory Information Element (IE)
(C) Conditional IE
(O) Optional IE According to an aspect of the subject matter described herein, DSR 100 and more specifically, Diameter address resolution module 104, may implement a routing entity identity preference list where messages are searched for specific routing entity identities and routing rules are applied according to preferences among the routing entity identities. As illustrated in Table 1, Diameter messages may have one or more routing entity identities. The user identities may be conditional and optional, which means that sometimes a message has an IMSI only, sometimes an IMPU only, sometimes an MSISDN only, and sometimes combinations of these parameters. Diameter address resolution module 104 may provide a generic framework that allows the operator to determine, through user configuration, which routing entity identity types in each message to use for an address resolution. Routing entity identity preferences may be supported by the routing entity identity preference list implemented in DSR100 and that is configurable by the network operator. The applications listed in Table 1, the routing entity identities that address resolution may support can be located in the AVPs specified in Table 2 below.

TABLE 2

AVPs for Routing Entity Identity Types

| Routing Entity Identity Type | AVPs |  |  |  |  |  |  |
|---|---|---|---|---|---|---|---|
|  | User-Identity | Public-Identity | User-Name | Subscription-Id | Service-Information | Framed-IP-Address | Framed-IPv6-Prefix |
| IMSI |  |  | X | X | X |  |  |
| MSISDN | X |  |  | X | X |  |  |
| IMPU | X | X |  | X | X |  |  |
| IPv4 Address |  |  |  |  |  | X |  |

TABLE 2-continued

AVPs for Routing Entity Identity Types

| Routing Entity Identity Type | AVPs | | | | | | |
|---|---|---|---|---|---|---|---|
| | User-Identity | Public-Identity | User-Name | Subscription-Id | Service-Information | Framed-IP-Address | Framed-IPv6-Prefix |
| IPv6 Address | | | | | | | X |

Table 2 lists combinations of routing entity identities and AVPs that may be present in Diameter signaling messages and used by address resolution module 104. However, the subject matter described herein is not limited to the examples in Table 2. Using any routing entity identity and AVP combination to search received Diameter signaling messages and perform address resolution is intended to be within the scope of the subject matter described herein.

One implementation, to provide a generic framework to support any Diameter application, Diameter address resolution module 104 will look for a routing entity identity type in the set of AVPs shown in Table 2 regardless of the application ID or command code in the received message. Address resolution module 104 will initially search the message looking for the AVP's that may contain the highest priority routing entity identity type that the operator has defined. As shown in Table 2, a routing entity identity type may be located in more than one AVP. This will be described in more detail below. Routing entity identities may also be embedded in AVPs of type "grouped".

When address resolution module 104 encounters an AVP which may contain the desired routing entity identity type for which it is searching, Diameter address resolution module 104 may perform the following:

Determine whether the routing entity identity type is actually in the AVP (This mainly applies to grouped AVPs); and If the desired routing entity identity type is found, than the address content may be verified (e.g., doesn't contain any invalid address characters). Address normalization may be performed to eliminate such characters. Address normalization will be described in more detail below.

If the desired routing entity identity is not found in the candidate AVP or the AVP contains the desired routing entity identity but its content is not supported by address resolution module 104, then address resolution module 104 may continue searching the message for another candidate AVP. Because multiple instances of AVPs may exist in the same message, address resolution module 104 may search through all AVPs and AVPs instances in the message that may contain the desired routing entity identity until a valid address is found.

If a valid routing entity identity is not found for the highest priority routing entity identity preference, and a next highest routing entity identity preference has been defined, then an address resolution module 104 will repeat the above procedure by searching the message for the next highest priority routing entity identity that has been defined. The procedure may be repeated until a valid routing entity identity is found or the preference list is exhausted. If no routing entity identity is found, then routing exception handling may be performed. Routing exception handling will be described in more detail below. If a valid address is found, then routing entity identity searching is complete. Address resolution module 104 may take the address digits and search a data structure referred to as a digit range table (DRT) associated with the application ID, command code, and routing entity identity type, looking for a match. If the DRT search fails (no matches), then routing fails and no further address resolution processing of the ingress message will occur. Routing exception handling with then be performed. If the DRT search is successful, then the destination address associated with the matching entry is used for routing the message. Individual address override may also be performed, as will be described in more detail below.

Figure 3:
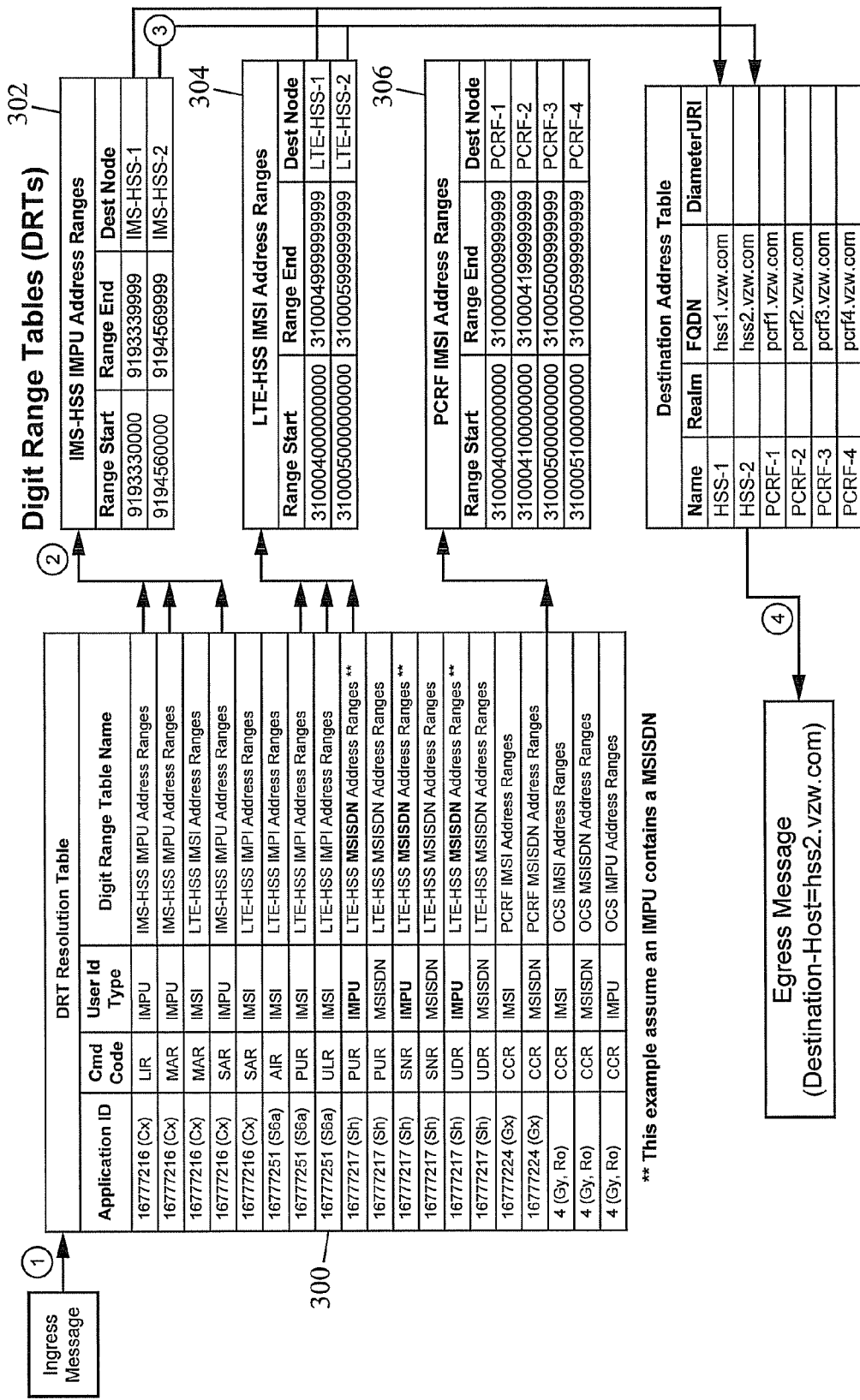
FIG. 3 is a block diagram illustrating a hierarchy of tables used for Diameter address resolution according to an embodiment of the subject mattered described herein.

In the preceding paragraph, it is indicated that address resolution module 104 serially searches a received message until a valid routing entity identity is found. However, the subject matter described herein is not limited to such an embodiment. In an alternate embodiment, address resolution module 104 may search a received message for all possible routing entities and then perform the DRT lookup on the entities in the priority order configured by the user until a lookup is successful. A DRT is a set of addresses for a user or routing entity identity type which are serviced by server type (e.g., IMS-HSS, LTE-HSS, PCRF, OCS, OFCS). Each entry in the DRT may be a continuous block or range of addresses which are serviced by one of the servers (e.g., LTE-HSS1). A DRT may be associated with a destination address, which is typically a specific Diameter node assigned a FQDN. FIG. 3 is an example of a data structure for a DRT that may be used by Diameter address resolution module 104. Referring to FIG. 3, an ingress message received by Diameter address resolution module 104 is searched for its most preferred routing entity identity. That identity, if present, is used to locate a destination address using the hierarchy illustrated in FIG. 3. If the most preferred identity is not present, then address resolution using the hierarchy illustrated in FIG. 3 is performed using the next most preferred routing entity identity.

Once the address is resolved using the hierarchy illustrated in FIG. 3, final routing is performed. Final routing may be performed by routing module 105 illustrated in FIG. 1. The final routing that is performed may depend on the Diameter node type for the ingress application ID, as illustrated in FIG. 2.

If the user configurable Diameter node type for the ingress application ID is proxy agent, final routing may be performed as follows:
    If the destination address has been configured with a Realm:
        Address resolution module 104 will replace the destination realm and destination host AVPs in the ingress message with a destination-realm, and, if the destination address has a FQDN, also insert a single destination host AVP immediately after the header
    Otherwise (destination address has been configured with a FQDN only):
        Address resolution will replace the destination host AVP in the ingress message with a single destination host AVP after the header If the user configurable Diameter node type for the ingress application ID is redirect agent, final routing may be performed as follows:
    If the destination address has been configured with a Diameter URI:
        Send a Normal redirect agent answer response with E bit=1, result-code value=3006 (DIAMETER_REDIRECT_INDICATION), and a single redirect-host AVP with a resolved destination addresses Diameter URI
        Note: Diameter supports the ability for a redirect agent to respond with a prioritized list of destinations (multiple instances of the redirect host AVP). However, this capability is optional.

Otherwise (destination address has been misconfigured for sending redirect responses):

Send an abnormal redirect agent answer response with result-code equals 5012 (DIAMETER_UNABLE_TO_COMPLY)

Generate OAM event

Figure 4:
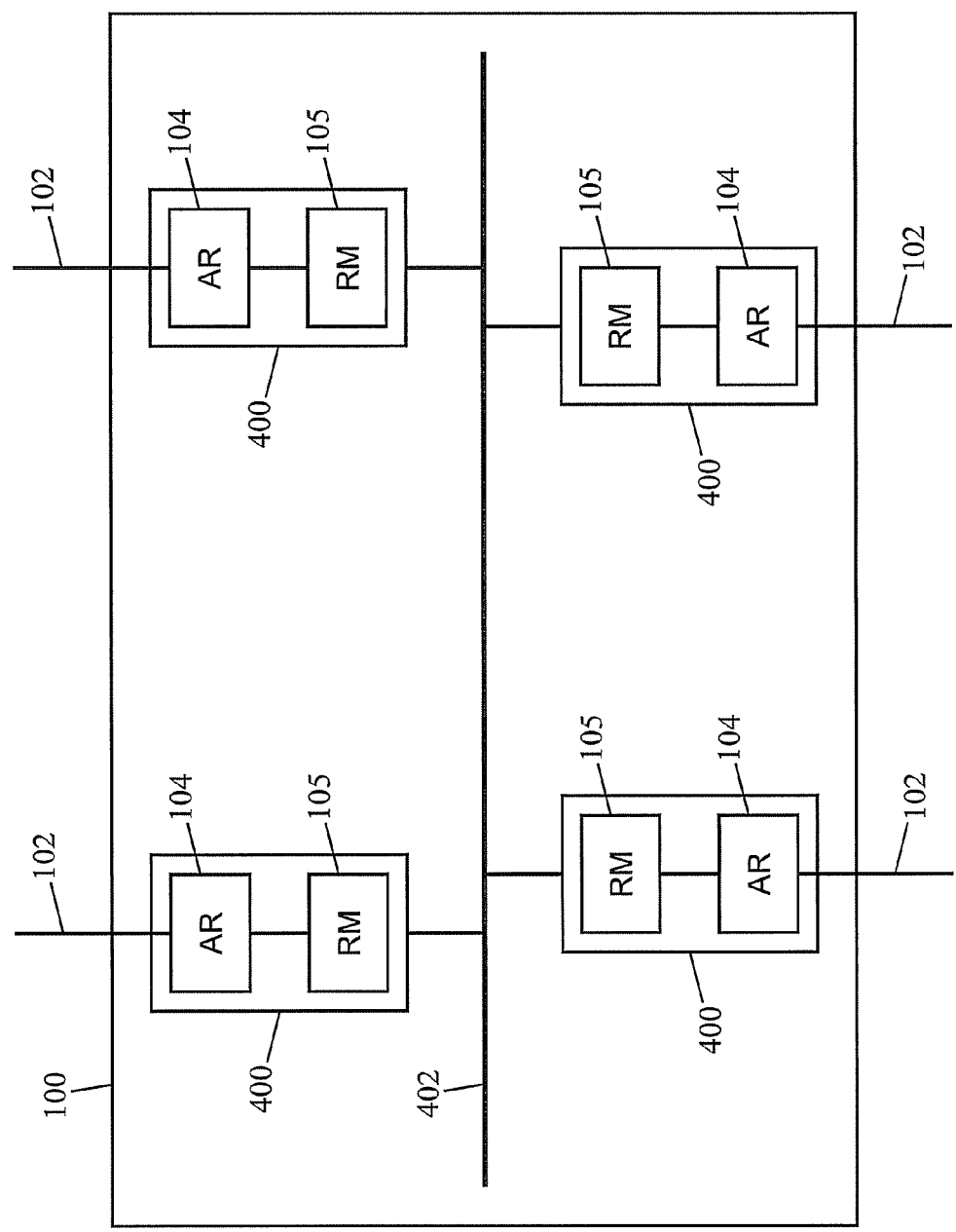
FIG. 4 is a block diagram illustrating an exemplary internal architecture for DSR configured to perform Diameter address resolution according to an embodiment of the subject matter described herein.

Once the final address is resolved, the message is forwarded to the Diameter routing layer where the message is routed from the ingress Diameter message processing module to the egress Diameter processing module associated with the destination. FIG. 4 illustrates an exemplary architecture for DSR 100. In FIG. 4, DSR 100 includes a plurality of message processors 400 connected to each other via a bus 402. Each message processor includes an address resolution module 104 and a routing module 105. For ingress messages, the receiving address resolution module 104 determines the Diameter routing address and the routing module 105 forwards the message to the message processor 400 associated with the next hop to that address. The egress message processor 400 may maintain Diameter routing layer message queues, which may be used to abort routing if the queues are full and thereby control the flow of messages directed to a particular destination node.

According to another aspect of the subject matter described herein, address resolution module 104 may perform routing exception processing if it is unable to find a Diameter destination address for a message. Routing exception processing may be configurable, and may be performed as follows:

Address resolution module 104 encounter problems which prevent it from successfully finding a Destination Address for the message:
(1) The Application ID in the ingress message is not provisioned for Address Resolution
(2) The Application ID is valid but the Command Code in the message is not provisioned for address resolution
(3) The message does not contain a routing entity specified in the routing entity identity for the ordered pair (Application ID, Command Code)
(4) A valid routing entity identity was found but did not match a DRT entry If the Application ID is not supported by address resolution (as determined from user-configuration) then the Diameter routing layer address resolution table (which defines application identities for which address resolution is to be performed) is most likely mis-aligned with address resolution's configuration.

An application-specific response cannot be sent

Address resolution may send an Answer response with Result-Code AVP value set to 3007 (DIAMETER_APPLICATION_UNSUPPORTED)

For routing exceptions associated with Application IDs supported by address resolution (exceptions 2-4 above), address resolution module 104 may provide the following user-configurable ACTION options:

Forward route the message unchanged (Default)

Forward route the message with a Default Destination

Send Answer response with a user-configurable Result-Code or Experimental-Result-Code value The routing exception ACTIONs will be user-configurable "per exception type" and "per Application ID*"

Note: For the Diameter interfaces illustrated in FIG. 2, there appears to be no Command Codes within the same Diameter application which can be routed to a different default destination type (e.g., HSS versus PCRF). If this is needed, then the routing exception action "Default Destination" option should be configurable per (Application ID, Command Code)

Address Ranges and Address Normalization

As set forth in FIG. 3, tables 302, 304, and 306 used to resolve Diameter destination addresses may include ranges of addresses that are compared to the preferred user identity identified in a received message. An address range may include a range of digits, such as 9195550000-9195559999. Ranges may be of different sizes. For example, the range 303200-3032999 may coexist with the aforementioned 919 range. Ranges with equal start and end values may be supported. Address ranges may be supported for all user identity types, including IPv4 and IPv6 addresses.

Many characters present in an AVP may not be part of the user identity that is used to search the range tables illustrated in FIG. 3. For such identities, address resolution module 104 may perform address normalization. Address normalization may include removing prefixes such as "SIP:" and "TEL:+" from SIP and tel URIs in the messages. Similarly, suffixes such as "@ domain" in URIs and NAIs must be ignored. Visual separators, such as ".", "-", and "/" commonly found in URIs must be ignored. As an example of address normalization that may be performed by Diameter address resolution module 104, the raw AVP address: "tel:+1-919-444-1212" may be converted to "9194441212" after normalization.

AVPs Containing User Identities

As set forth above, address resolution module 104 may perform address resolution based on any one or more of the following AVPs that contain user identity address information.

User-Identity
Public-Identity
MSISDN
Subscription-ID
Service-Information
Framed-IP-Address
Framed-IPv6-Prefix The user identity AVP contains either the IMPU or the MSISDN. The IMPU is embedded in a public identity value pair. The MSISDN is embedded in a MSISDN AVP.

The public identity AVP contains an IMPU. The IMPU may be a type UTF-8 string and may be in the form of SIP URI or a tel URI.

The MSISDN AVP contains the MSISDN in international format. The MSISDN may be encoded as a TBCD string with two digits per octet. The MSISDN AVP contains the IMPI or the IMSI. The user identity address will be stored in the user name portion of the NAI. An example of an IMSI that may be encoded in the NAI is IMSI@ims.mnc<MNC>.mcc<MCC>.3gppnetwork.org. An example of an IMPI that may be encoded in the NAI is 9194441212@vzw.com.

The subscription ID AVP may contain one of five user identity types as defined by the embedded subscription ID type AVP. The types that may be included are end user E.164 number, end user IMSI, end user SIP URI, end user NAI, or end user private address.

The service information AVP may contain one or more subscription ID AVPs. The subscription ID AVPs and the service information AVP may contain the identities described above. The framed IP address AVP may contain an IPv4 address of the subscriber. Similarly, the framed IPv6 prefix AVP may contain the IPv6 prefix of the subscriber's IPv6 address. The prefix is the routable portion of the IPv6 address.

Public identity and subscription ID AVPs may include SIP and/or tel URIs. SIP and tel URIs contain the IMPU of an IMS user. Because SIP and tel URIs have a canonical form, address resolution module 104 may extract the appropriate data, such as the E.164 number used to perform the address resolution.

Individual Address Resolution Override

Figure 5:
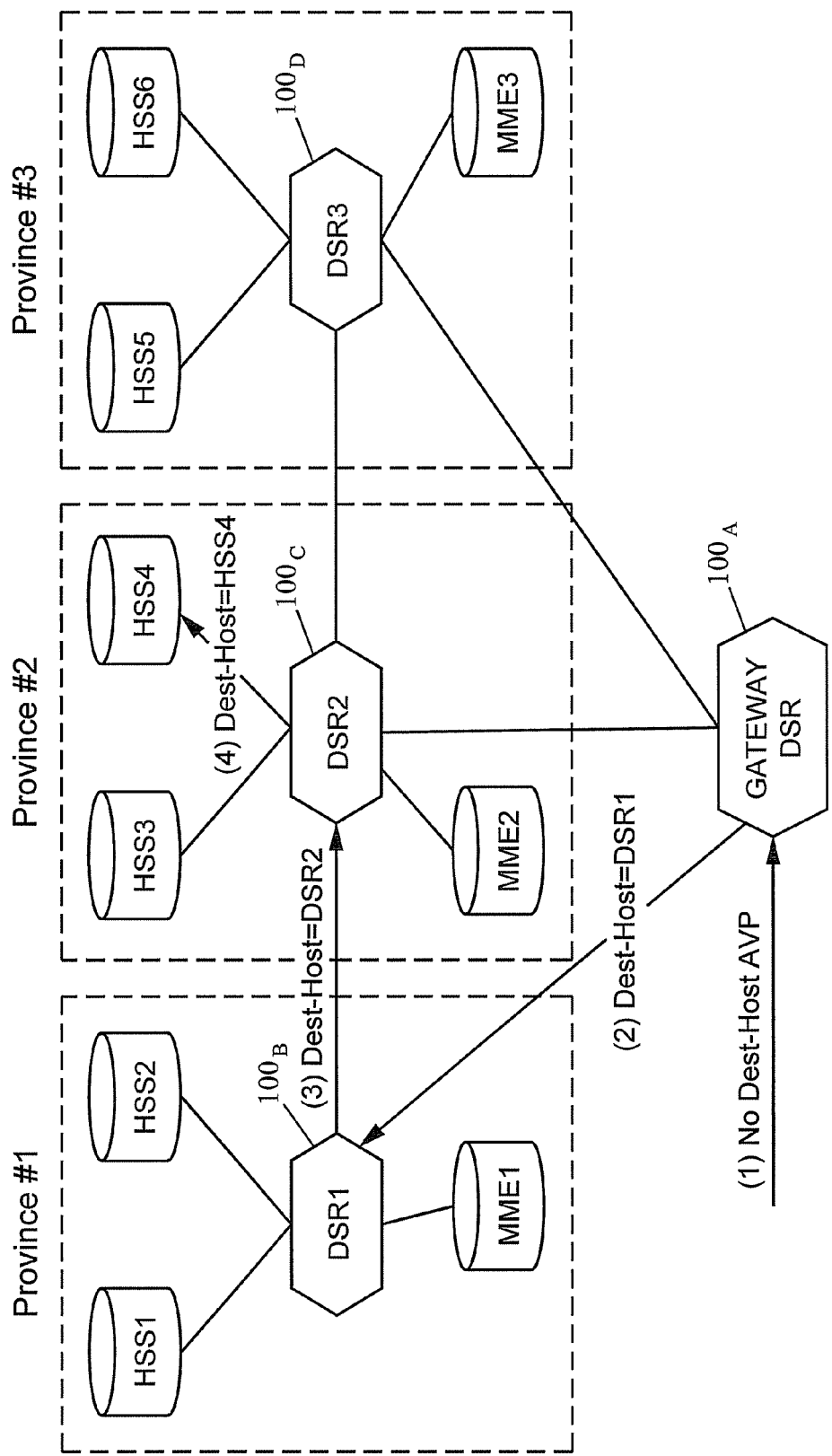
FIG. 5 is a network diagram illustrating a hierarchy of DSRs capable of performing Diameter address resolution with individual address resolution override according to an embodiment of the subject described herein.

In the example illustrated in FIG. 3, identities are used to search ranges of addresses. Range based address resolution assumes that all of the addresses of a certain type (e.g., IMSI) are divided into ranges that are allocated to a destination. It may be desirable to override range based address resolution for individual addresses. For example, as illustrated in FIG. 5, multiple DSRs 100 may be deployed in a hierarchical network. As messages arrive at gateway DSR $100_A$, its address resolution module may be provisioned to route the messages to one or more province DSRs $100_B$, $100_C$, or $100_D$. Each province DSR may perform the final address resolution and final routing. Address resolution at gateway DSR $100_A$ may or may not be to the final destination. For example, if the operator wants final destination routing decisions to occur at the provinces, then the operator may configure gateway DSR $100_A$ to resolve the addresses to the province DSRs.

At each province DSR $100_B$, $100_C$, or $100_D$, the operator may want the flexibility to transparently move subscribers (i.e., without forcing subscribers to change their phone numbers or subscriber identities). In this example, gateway DSR $100_A$ will perform HSS address resolution to either province DSR $100_B$, $100_C$, or $100_D$. When gateway DSR $100_A$ forwards a message to province DSR $100_B$, province DSR $100_B$ may perform address resolution a second time to determine the final destination address. However, some of the subscribers in province 1 may have been moved to province 2. After the address resolution on province $100_B$ successfully resolves to a destination address, province DSR $100_B$ may review an individual override table associated with the DRT in province DSR $100_B$ to see if the user identity address has been moved. If the user identity address is found, IOT resolution takes precedence over DRT resolution.

For each DRT that address resolution overriding is supported, a separate IOT will be required. An IOT may be configured with the following attributes:
IOT Name
DRT Name (which is associated with this IOT)
Address String
For Proxy Agent addressing:
   Realm
   Host (FQDN)
For Redirect Agent addressing:
   DiameterURI
Allow Subsequent Address Resolutions: No (Default), Yes
   See subsequent slides on this topic
The use of Realm, Host, and DiameterURI values in the IOT as identical to the same attributes in the destination address table illustrated in FIG. 3.

Preventing Multiple Invocations of the Same Address Resolution Application

Figure 6:
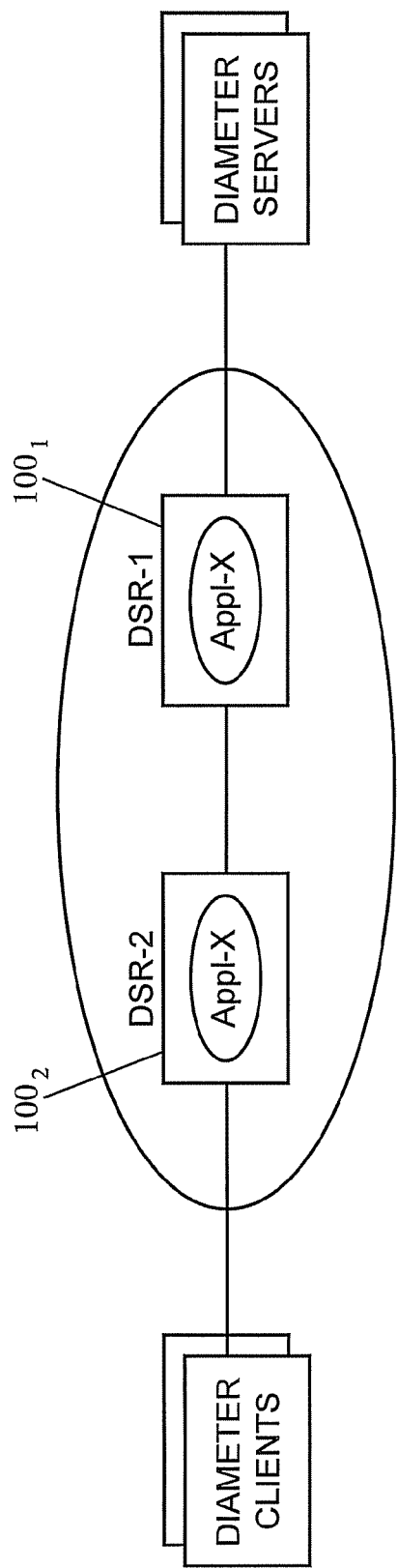
FIG. 6 is a network diagram illustrating prevention of identical address resolution by multiple DSRs configured with Diameter address resolution according to an embodiment of the subject matter described herein.

According to another aspect of the subject matter described herein, a DSR provisioned with address resolution as described herein may include the capability to prevent multiple identical address resolutions to be performed on the same message. This problem may occur if more than one DSR with overlapping address resolution data is deployed in a customer's network, as illustrated in FIG. 6. In FIG. 6, DSRs $100_1$ and $100_2$ are deployed in a customer's network. If DSR $100_1$ performs an address resolution, it is desirable to ensure that DSR $100_2$ does not perform the same address resolution on the same message. In one implementation, plural address resolution prevention may be configured on a per DRT and per IOT entry basis. For example, in the individual address resolution override use case, all of the HSS DRT entries in gateway DSR $100_A$ may be configured to allow subsequent address resolutions to occur at the province DSRs. However, if the gateway DSRs HSS-DRT supports an IOT, any entries in the IOT which resolve to a final destination address are preferably not configured to allow subsequent address resolutions to occur. Once an address resolution is performed on a message, the message may be marked, based on the DRT or IOT entry, to indicate that the address resolution has been performed. If a subsequent address resolution is attempted on the same message, the marking from the previous address resolution may prevent the address resolution from being performed. A system wide user configurable parameter may also be used to disable the prevention solution.

Figure 7:
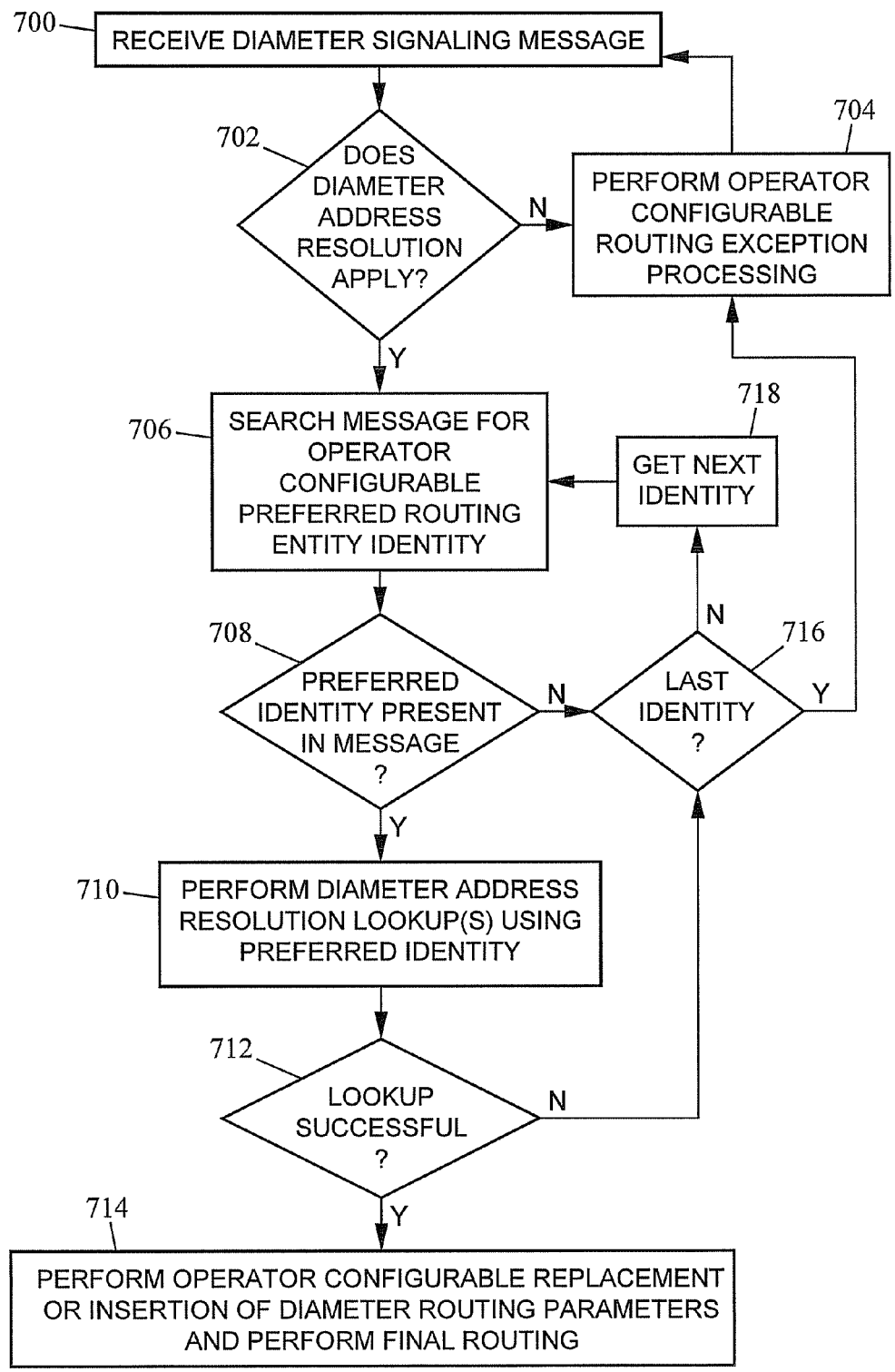
FIG. 7 is a flow chart of an exemplary process for configurable Diameter address resolution according to an embodiment of the subject matter described herein.

FIG. 7 is a flow chart illustrating an exemplary overall steps for Diameter address resolution according to an embodiment of the subject matter described herein. Referring to FIG. 7, in step 700, a Diameter signaling message is received. For example, the message may be received by DSR 100 illustrated in FIG. 1. In step 702, it is determined whether Diameter address resolution applies to the message. DSR 100 may be configured such that specific applications IDs are provisioned for Diameter address resolution and others are configured for routing only. Table 1 shown above illustrates exemplary application identifiers for which address resolution may be configured.

If in step 702 it is determined that Diameter address resolution does not apply, control proceeds to step 704 where an operator configurable routing exception processing in action is performed. For example, DSR 100 may be configured to route the message unchanged, route the message to a default destination, or send an answer with a user configurable result code or experimental result code value.

Returning to step 702, if it is determined that Diameter address resolution applies, control proceeds to step 706 with a message is searched for an operator configurable preferred routing entity identity. As set forth above, the network operator may provision a list of preferred routing entity identities and attribute value pairs where the identities are located to be used in searching a received message. In step 708, if the preferred identity is determined to be present in the message, control proceeds to step 710 where one or more Diameter address resolution lookups are performed using the preferred identity. The lookup may be performed in a data structure, such as that illustrated in FIG. 3.

In step 712, it is determined whether the lookup was successful. If the lookup was successful in locating a matching entry, control proceeds to step 714 where operator configurable replacement or insertion of Diameter routing parameters and final routing are performed. As set forth above, if the received message is being routed, operator configurable replacement of parameters in the received message, such as the destination realm and/or the destination host, may be performed. The message may then be routed. If a new message, such as an answer to a received Diameter request, is being formed, the Diameter routing parameters located in the lookup may be inserted in the answer message and the message may be sent to the originator of the Diameter request.

Returning to step 708, if the preferred routing entity identity is determined not to be present in the received message, control proceeds to step 716 where it is determined whether the identity is the last identity in the preferred identity list. If the identity is the last identity, control proceeds to step 704 where operator configurable routing exception processing is performed as set forth above. If the identity is not the last identity in the preferred identity list, control proceeds to step 718 where the next identity is retrieved and then to step 706 where the message is searched for the next identity. Similarly, in step 712, if the Diameter address resolution lookup is not successful, control proceeds to step 716 where it is determined whether the identity for which the Diameter address resolution lookup was performed is the last identity in the preferred identity list. If the identity is the last identity, control proceeds to step 704 where operator configurable routing exception processing is performed. If in step 716, the identity is not the last identity, the next identity is extracted from the message in step 718 and control returns to step 706 where the message is searched for the next operator configurable preferred routing entity identity. The process may continue until the address resolution is performed or a routing exception occurs. The process may be repeated for each received Diameter signaling message.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A Diameter signaling router (DSR) including:
a network interface for sending Diameter signaling messages to and receiving Diameter signaling messages from Diameter signaling entities in a network;
a Diameter address resolution module configured to provide for configuration of a plurality of routing entity identities and an order of preference for using the plurality of routing entity identities in performing Diameter address resolution, wherein the Diameter address resolution module searches attribute value pairs within a received Diameter signaling message for specific routing entity identities by searching a received Diameter signaling message for a most preferred routing entity identity specified by the order, and, in response to failing to locate the most preferred routing entity identity, searching for a next most preferred routing entity identity, and, if located, using the next most preferred network routing entity identity in performing the routing address resolution, determines which routing entity identity to use for the message based on the configured order of preference by using, in the order, routing entity identities located in the message to perform the routing address resolution until an instance of the routing address resolution is successful, and uses the determined routing entity identity to look up Diameter address information; and
a Diameter routing module configured to route the Diameter signaling message using the Diameter address information determined by the Diameter routing address resolution module, wherein the routing entity identity comprises an identifier in a Diameter signaling message that identifies an entity and that is resolved into Diameter address information.

2. The system of claim 1 wherein the Diameter address resolution module provides for configuration of specific attribute value pairs to be searched for the routing entity identities.

3. The system of claim 1 wherein the Diameter address resolution module is configured to provide for configuration of routing exceptions for Diameter signaling messages for which the Diameter routing address resolution fails.

4. The system of claim 3 wherein the routing exceptions include forwarding received Diameter messages, routing received Diameter messages to a default destination, or formulating a Diameter answer message with a configurable error code.

5. The system of claim 1 wherein the Diameter address resolution module is configured to replace Diameter address information in received Diameter signaling messages to be routed or to insert the Diameter address information determined in the Diameter address resolution into Diameter response messages generated in response to received Diameter request messages.

6. The system in claim 1 wherein the DSR is configured to function as a Diameter proxy agent and as a Diameter redirect agent.

7. The system in claim 1 wherein the Diameter address resolution module is configured to perform an individual address override lookup for a routing entity identity and, if successful, to bypass a range based Diameter routing address resolution lookup.

8. The system of claim 7 wherein the individual override lookup allows records for individual subscribers to be moved among Diameter service nodes.

9. The system of claim 1 wherein the Diameter address resolution module is configured to prevent multiple invocations of the same Diameter address resolution by marking a Diameter signaling message for which a Diameter routing address resolution is performed.

10. A method for configurable Diameter address resolution, the method comprising:
in a Diameter signaling router (DSR):
sending Diameter signaling messages to and receiving Diameter signaling messages from Diameter signaling entities in a network;
providing for configuration of a plurality of routing entity identities and an order of preference for using the plurality of routing entity identities in performing Diameter address resolution; and
receiving a Diameter signaling message, searching attribute value pairs within the received message for specific routing entity identities by searching a received Diameter signaling message for a most preferred routing entity identity specified by the order, and, in response to failing to locate the most preferred routing entity identity, searching for a next most preferred routing entity identity, and, if located, using the next most preferred network routing entity identity in performing the routing address resolution, determining which routing entity identity to use for the message based on the configured order of preference by using, in the order, routing entity identities located in the message to perform the routing address resolution until an instance of the routing address resolution is successful, using the determined routing entity identity to look up Diameter address information, and routing the received message using the Diameter address information, wherein the routing entity identity comprises an identifier in a Diameter signaling message that identifies an entity and that is resolved into Diameter address information.

11. The method of claim 10 comprising providing for configuration of specific attribute value pairs in which the DSR is configured to search for the routing entity identities.

12. The method of claim 10 comprising providing for configuration of routing exceptions for Diameter signaling messages for which the Diameter routing address resolution fails.

13. The method of claim 12 wherein the routing exceptions include routing the messages, routing the messages to a default destination, and generating an answer message with an error code.

14. The method of claim 10 comprising replacing Diameter destination parameters in received messages to be routed or inserting Diameter address information determined in the Diameter address resolution in Diameter response messages to be transmitted in response to Diameter request messages.

15. The method of claim 10 comprising, at the DSR, functioning as both a Diameter proxy agent and a Diameter redirect agent.

16. The method of claim 10 wherein performing the Diameter address resolution comprises performing a lookup in an individual address override table followed by a lookup in a range-based table if the lookup in the individual address override table fails.

17. The method of claim 16 wherein the individual override table is provisioned with routing entity identities corresponding to subscribers whose records have been moved among Diameter service nodes.

18. The method of claim 10 comprising marking egress Diameter signaling messages for which address resolution is successful to prevent multiple invocations of the same Diameter address resolution.

19. A non-transitory readable medium having stored thereon executable instructions that, when executed by a processor of a computer, control the computer to perform steps comprising:

in a network node for sending Diameter signaling messages to and receiving Diameter signaling messages from Diameter signaling entities in a network:

providing for configuration of a plurality of routing entity identities and an order of preference for using the plurality of routing entity identities in performing Diameter address resolution; and receiving a Diameter signaling message, searching attribute value pairs within the received message for specific routing entity identities by searching a received Diameter signaling message for a most preferred routing entity identity specified by the order, and, in response to failing to locate the most preferred routing entity identity, searching for a next most preferred routing entity identity, and, if located, using the next most preferred network routing entity identity in performing the routing address resolution, determining which routing entity identity to use for the message based on the configured order of preference by using, in the order, routing entity identities located in the message to perform the routing address resolution until an instance of the routing address resolution is successful, using the determined routing entity identity to look up Diameter address information, and routing the received message using the Diameter address information, wherein the routing entity identity comprises an identifier in a Diameter signaling message that identifies an entity and that is resolved into Diameter address information.

* * * * *